Feb. 21, 1950     C. BUCKEL     2,498,246
BRAKE PEDAL LATCH
Filed Oct. 29, 1947
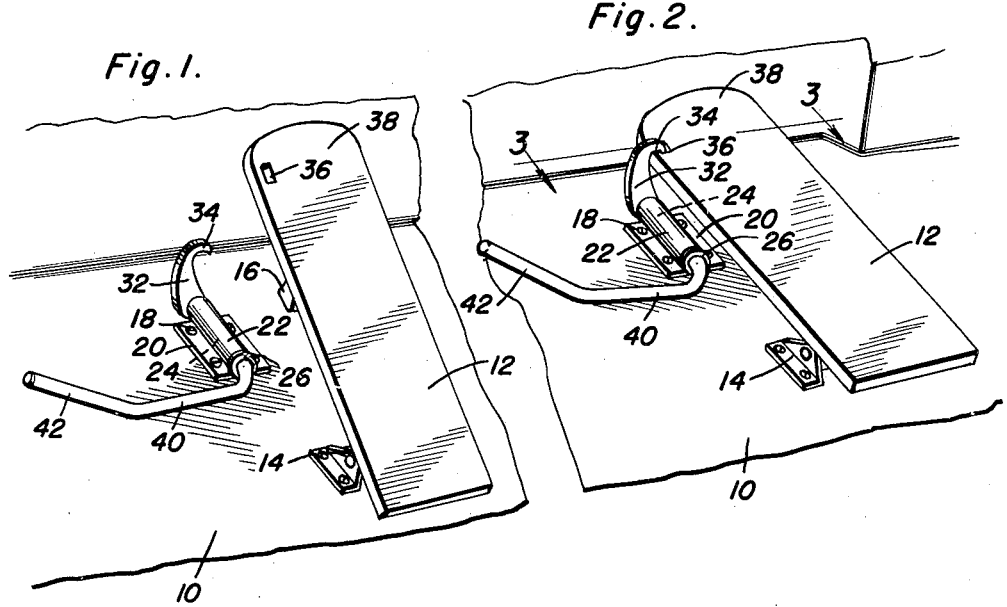
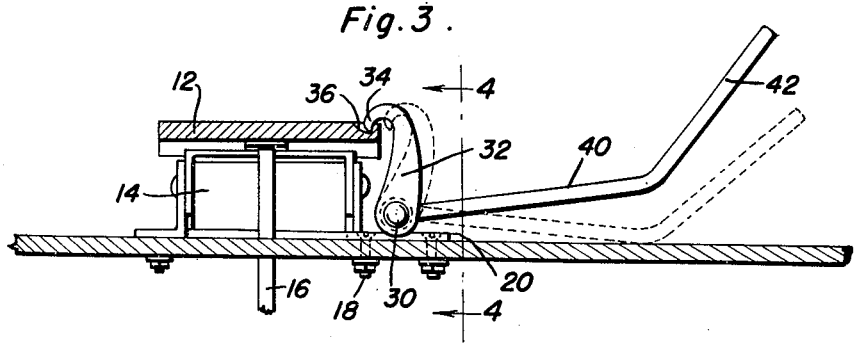
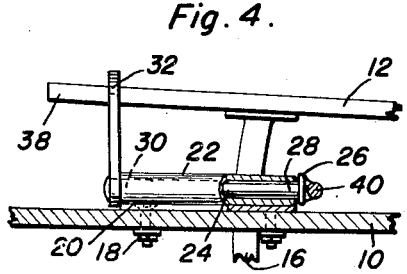
Charles Buckel
INVENTOR.

Patented Feb. 21, 1950

2,498,246

UNITED STATES PATENT OFFICE 2,498,246

BRAKE PEDAL LATCH

Charles Buckel, Springfield, Oreg.

Application October 29, 1947, Serial No. 782,888

1 Claim. (Cl. 74—542)

This invention relates to new and useful improvements in latches and the primary object of the present invention is to provide a device for retaining the spring urged brake pedal of a heavy vehicle or truck in a lowered and actuated position for preventing accidental movement of the vehicle when unattended.

Another important object of the present invention is to provide a brake pedal latch for air brakes and the like including novel and improved means whereby the latch may be actuated to a locked or unlocked position by an operator's foot.

A further object of the present invention is to provide a brake pedal latch that is quickly and readily installed on a vehicle floor board for convenient application with a brake pedal.

A still further aim of the present invention is to provide a brake pedal latch that is simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which—

Figure 1 is a fragmentary perspective view of a vehicle floor board, the brake pedal being in a raised position, and the present latch mechanism in an unlocked position;

Figure 2 is a similar view of Figure 1, and showing the latch mechanism in a locked position for retaining the brake pedal in a lowered position;

Figure 3 is a transverse vertical sectional view taken substantially on the plane of section line 3—3 of Figure 2; and, Figure 4 is a fragmentary longitudinal vertical sectional taken substantially on the plane of section line 4—4 of Figure 3.

Referring now to the drawing in detail, wherein for the purpose of illustration, there is disclosed a preferred embodiment of the present invention, the numeral 10 represents the floor board of a heavy vehicle or truck that is provided with a brake pedal 12, normally urged to a raised position by a spring 14 that is secured to the floor board and to the pedal adjacent one end thereof. This brake pedal 12 is connected in a usual manner to an air brake actuating rod 16 for the vehicle or truck.

Removably secured by fasteners or the like 18 to the floor board 10, is a base or anchor plate 20 that supports a journal or sleeve 22, the longitudinal axis of which is spaced parallel to the longitudinal axis of the foot pedal 12. Rotatably mounted in the sleeve 22, is a lever bar 24 provided with an annular rib 26 at one end 28, that limits the longitudinal movement of the bar 24 in one direction. Rigidly secured to the opposite end 30 of the bar 24, is a hook member 32 the outer extremity 34 of which is engageable with a detent or recess 36 provided in the foot pedal 12 adjacent its free, normally raised end 38.

Projecting outwardly from the end 28 of the lever bar 24, is an integral actuating bar 40 that normally bears upon the floor board 10. The outer portion 42 of this actuating bar 40 is turned upwardly at an inclined angle to provide a foot engaging portion which may be actuated for engaging or disengaging the hook member with the said pedal.

It should be noted, that the present latch mechanism is not so designed as a substitute for a parking brake, but more-or-less as a safety measure in emergencies. Air brakes are usually installed with a hand valve for use on the trailer brakes, but there is no provision for keeping both the trailer brakes and the truck brake in the applied position without holding the pedal down. With the use of the present latch, a driver may lock every wheel on his vehicle, and in the case of an air line failure, may depart from the truck and lock the wheels before the air pressure is exhausted. It is also invaluable in that a driver may lock his brake pedal down and examine air lines for leakage before starting the vehicle.

Although depicted in the drawing, the present latch mechanism is applied to a foot pedal hinged at its lower end to a floor board, it should be noted, that the same is applicable to any type of brake pedal, whether it be hinged at the top, bottom, or beneath the floor board.

In view of the foregoing description taken in conjunction with the accompanying drawing it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

Means for retaining a spring-urged foot pedal in a lowered position relative to a floor board comprising, a sleeve secured to the floor board adjacent one edge of the pedal, said sleeve being spaced parallel to the longitudinal axis of the pedal, a lever bar rotatably mounted in said sleeve, and a hook fixed to one end of said bar, said pedal having a recess for engaging said hook to retain the foot pedal depressed and spaced slightly from a floor board, the remaining end of said lever bar being angulated to provide an upwardly inclined foot engaging portion and a bearing portion, said foot-engaging portion and said bearing portion being normally spaced from the floor board during engagement of the hook member with the foot pedal, and said bearing portion engaging the floor board upon disengagement of said hook member from said pedal to limit the outward movement of the hook member relative to the pedal, said foot engaging portion and said bearing portion forming a means for urging said hook member from said recess as the foot pedal is pressed against a floor board.

CHARLES BUCKEL.

REFERENCES CITED

The following references are of record in the file of this patent:

UNITED STATES PATENTS

| Number | Name | Date |
| --- | --- | --- |
| 2,388,002 | Maiwald | Oct. 30, 1945 |
| 2,399,835 | Stoner | May 7, 1946 |